(12) United States Patent
Lu et al.

(10) Patent No.: US 9,442,604 B2
(45) Date of Patent: Sep. 13, 2016

(54) OPTICAL-TOUCH CALIBRATION METHOD AND OPTICAL-TOUCH PANEL FOR CALIBRATING THE DEFORMATION BIAS ON THE OPTICAL-TOUCH PANEL

(71) Applicant: WISTRON CORP., New Taipei (TW)

(72) Inventors: Kuo-Hsien Lu, New Taipei (TW); Yu-Yen Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 44 days.

(21) Appl. No.: 14/180,367

(22) Filed: Feb. 14, 2014

(65) Prior Publication Data

US 2015/0062085 A1 Mar. 5, 2015

(30) Foreign Application Priority Data

Aug. 30, 2013 (TW) .............................. 102131346 A

(51) Int. Cl.
*G06F 3/042* (2006.01)
*G06F 3/041* (2006.01)

(52) U.S. Cl.
CPC ........... *G06F 3/0421* (2013.01); *G06F 3/0418* (2013.01)

(58) Field of Classification Search
CPC .... G06F 3/042; G06F 3/0421; G06F 3/0425; G06F 3/0428; G06F 2203/04109
USPC .......................................... 345/156, 173–178
See application file for complete search history.

(56) References Cited

U.S. PATENT DOCUMENTS

| | | | |
|---|---|---|---|
| 8,330,726 B2 | 12/2012 | Ogawa et al. | |
| 8,553,014 B2* | 10/2013 | Holmgren et al. | ........... 345/176 |
| 2010/0177062 A1 | 7/2010 | Liu et al. | |
| 2010/0321343 A1 | 12/2010 | Chou et al. | |
| 2012/0050226 A1* | 3/2012 | Kato | .............................. 345/175 |
| 2012/0154336 A1* | 6/2012 | Lee et al. | ....................... 345/175 |
| 2012/0262407 A1* | 10/2012 | Hinckley et al. | .............. 345/173 |

FOREIGN PATENT DOCUMENTS

| | | |
|---|---|---|
| TW | 201027407 A1 | 7/2010 |
| TW | 201101149 A1 | 1/2011 |

OTHER PUBLICATIONS

The office action of the corresponding Taiwanese application issued on Sep. 17, 2015 and its partial English translation.

* cited by examiner

*Primary Examiner* — Ram Mistry
(74) *Attorney, Agent, or Firm* — CKC & Partners Co., Ltd.

(57) ABSTRACT

An optical-touch calibration method and an optical-touch panel are disclosed herein. The optical-touch calibration method is suitable for the optical-touch panel including a projective light source and a line optical sensor. The optical-touch calibration method includes steps of: generating a projective beam by the projective light source, and the projective beam being reflected to the line optical sensor; utilizing the line optical sensor to measure the reflected projective beam for obtaining a reflected intensity curve relative to a linear coordinate axis; calculating an intensity difference between the reflected intensity curve and a reference intensity curve; and, adjusting an emitting power of the projective light source if the intensity difference exceeds a threshold value.

18 Claims, 6 Drawing Sheets

OPTICAL-TOUCH CALIBRATION METHOD AND OPTICAL-TOUCH PANEL FOR CALIBRATING THE DEFORMATION BIAS ON THE OPTICAL-TOUCH PANEL

RELATED APPLICATIONS

This application claims priority to Taiwanese Application Serial Number 102131346, filed Aug. 30, 2013, which is herein incorporated by reference.

BACKGROUND

1. Field of Disclosure

The present disclosure relates to a touch panel. More particularly, the present disclosure relates to an optical-touch panel and a controlling method thereof.

2. Description of Related Art

An optical sensor of an optical-touch system is usually fixed on the upper left corner or the upper right corner around the touch-sensing area. Sometimes, an external force may deform the plane of the touch-sensing area, and it may disposition the optical sensor from its original position related to the touch-sensing area, so that the receiving angle of the optical sensors may be affected accordingly. The disposition of the optical sensor may result in insufficient intensity of the received optical signal, and thereby it will cause noise or misalignment of touch-sensing (such as a discontinuous touch-sensing result while tracking a touch event).

Most of the optical touch modules available in the market utilize an area optical sensor (i.e., a planar-type optical sensor) to overcome aforesaid panel-deformation problem. The area optical sensor is capable of sensing toward different angles with its range of viewable angle. When a deformation occurs to the touch-sensing area, the area optical sensor can reselect an optimal sensing angle other than the current sensing angle. However, the area optical sensor is relatively expensive and complex in the manufacturing process, and also the area optical sensor occupies a larger volume and induces higher power consumption. Moreover, since the area optical sensor requires an extra step for selecting the optimal sensing angle (e.g., selecting different signal wirings corresponding to different sensing angles), the area optical sensor requires more time to capture images.

SUMMARY

Therefore, the disclosure provides an optical-touch calibration method and an optical-touch panel. The optical-touch panel includes a line optical sensor, which is utilized to obtain a reflected intensity curve relative to a linear coordinate axis. When a deformation occurs to the optical-touch panel, an intensity difference between the reflected intensity curve and a reference intensity curve is calculated, and an emitting power of the projective light source is adjusted according to the calculation result, so as to calibrate the deformation bias on the optical-touch panel.

An embodiment of the disclosure provides an optical-touch calibration method, which is suitable for an optical-touch panel including a projective light source and a line optical sensor. The optical-touch calibration method includes following steps. A projective beam is generated by the projective light source. The projective beam is reflected to the line optical sensor. The line optical sensor is utilized to measure the reflected projective beam for obtaining a reflected intensity curve relative to a linear coordinate axis. An intensity difference is calculated between the reflected intensity curve and a reference intensity curve. An emitting power of the projective light source is adjusted if the intensity difference exceeds a first threshold value.

Another embodiment of the disclosure provides an optical-touch panel, which includes a frame, a projective light source, a reflection unit, a line optical sensor and a control unit. The projective light source is disposed on the frame and configured for generating a projective beam. The reflection unit is disposed on the frame and configured for reflecting the projective beam. The line optical sensor is disposed on a first edge of the frame and configured for receiving and measuring the reflected projective beam, so as to obtain a reflected intensity curve relative to a linear coordinate axis. The control unit, which is coupled with the projective light source and the line optical sensor, is configured for calculating an intensity difference between the reflected intensity curve and a reference intensity curve. The control unit is further configured for adjusting an emitting power of the projective light source if the intensity difference exceeds a first threshold value.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
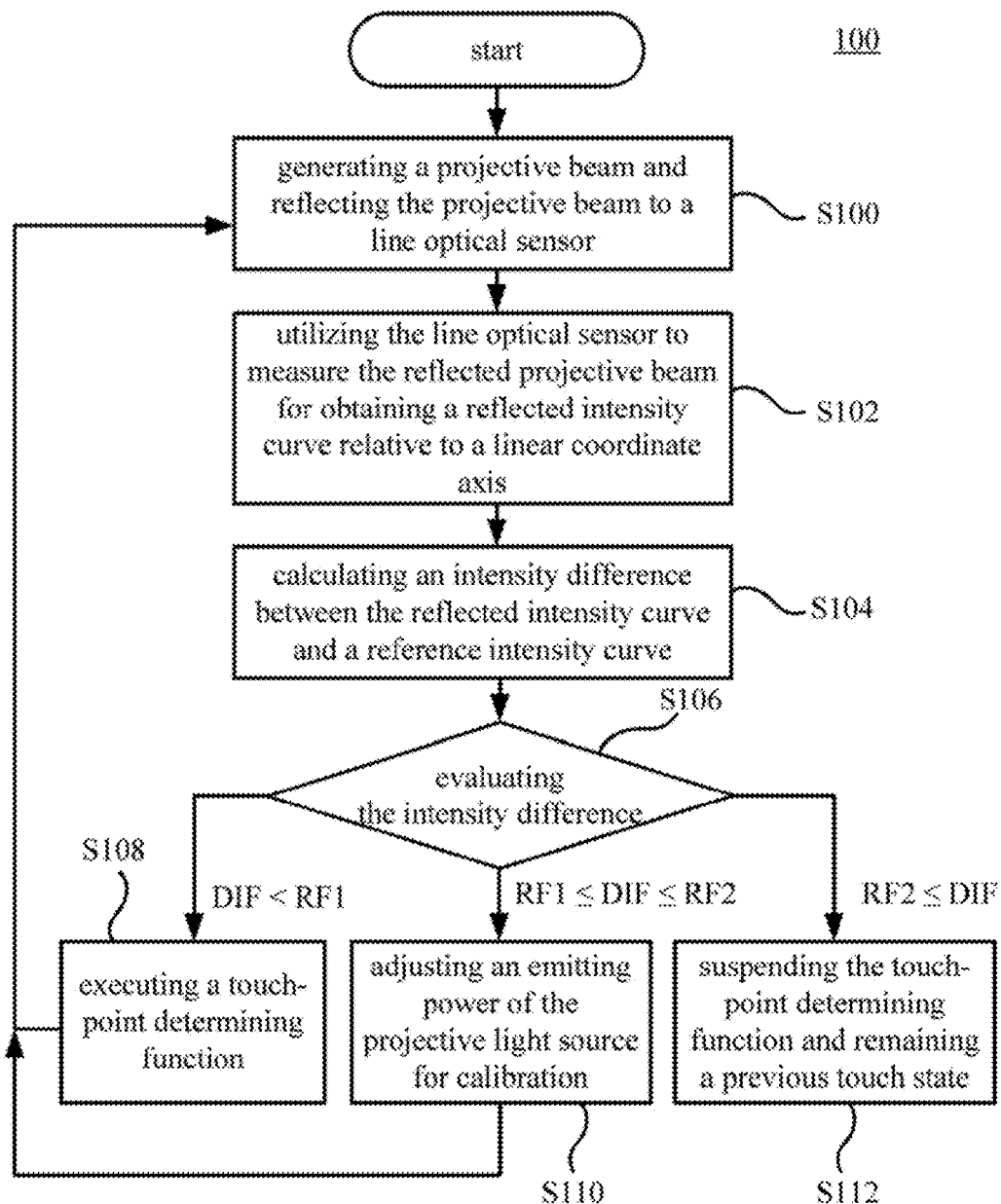
FIG. 1 is a schematic diagram illustrating flow charts of an optical-touch calibration method according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
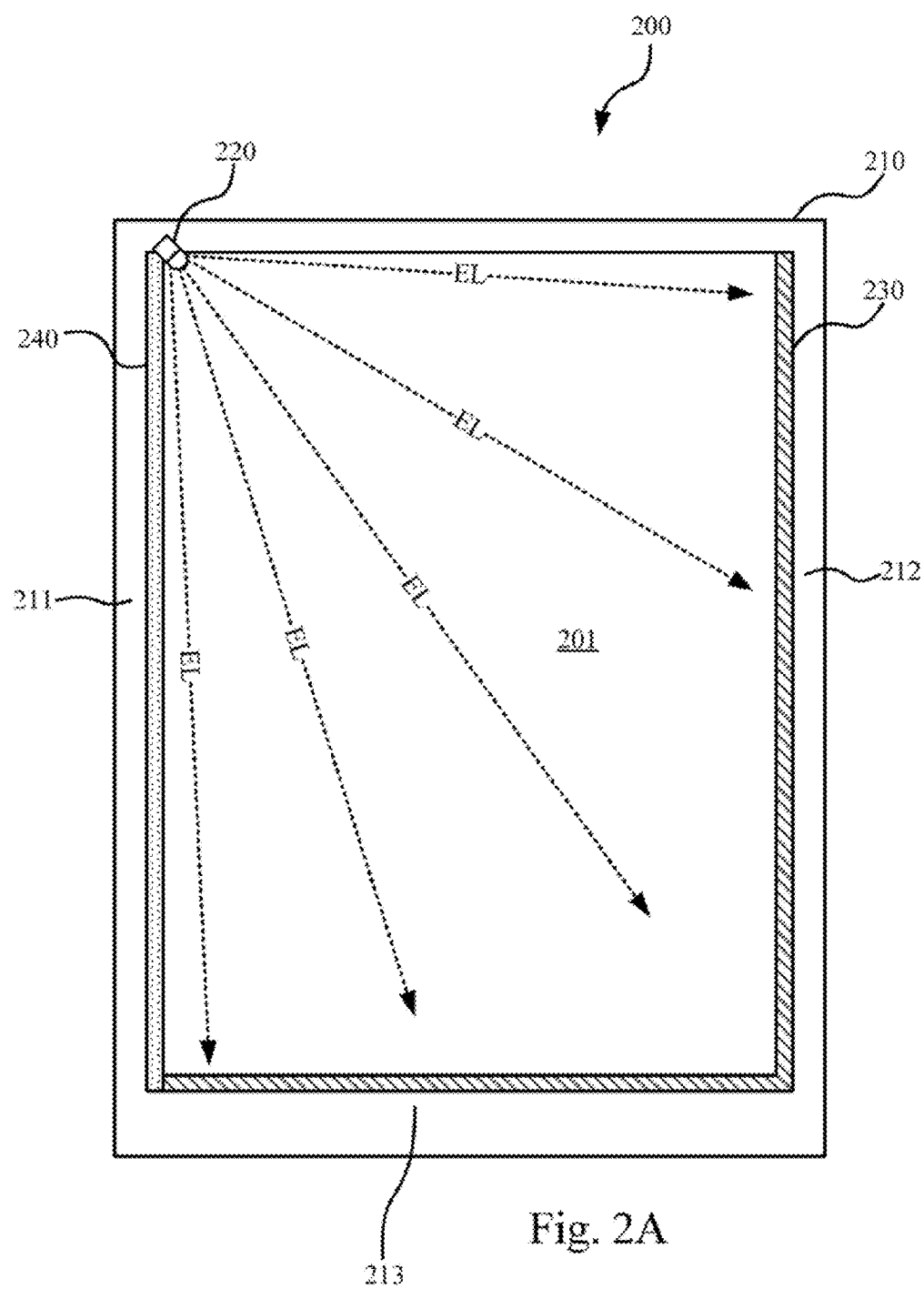
FIG. 2A is a top-view diagram illustrating an optical-touch panel according to an embodiment of the disclosure.
Figure 2B:
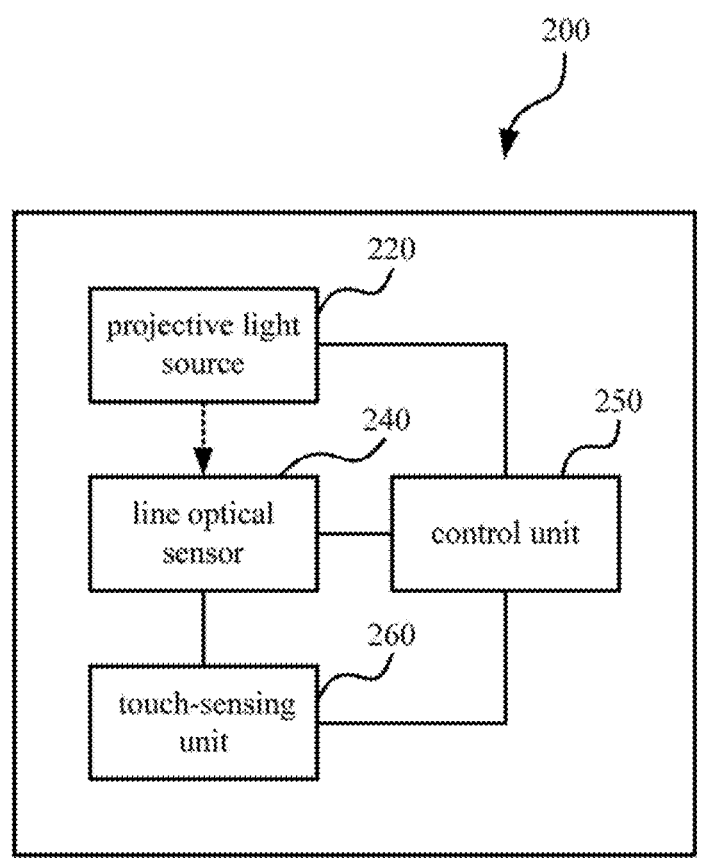
FIG. 2B is a functional block diagram illustrating the optical-touch panel in FIG. 2A.

Reference is made to FIG. 1, which is a schematic diagram illustrating flow charts of an optical-touch calibration method 100 according to an embodiment of the disclosure. In the embodiment, the optical-touch calibration method 100 is suitable for an optical-touch panel, which at least includes a projective light source and a line optical sensor. Reference is also made to FIG. 2A and FIG. 2B. FIG. 2A is a top-view diagram illustrating an optical-touch panel 200 according to an embodiment of the disclosure. FIG. 2B is a functional block diagram illustrating the optical-touch panel 200 in FIG. 2A. In the embodiment, the optical-touch calibration method 100 can be operated on the optical-touch panel 200.

As shown in FIG. 2A, the optical-touch panel 200 includes a frame 210, a projective light source 220, a reflection unit 230 and a line optical sensor 240. The projective light source 220 is disposed on the frame 210. In the embodiment shown in FIG. 2A, the projective light source 220 is disposed on the upper left corner of the frame 210 and configured for generating a projective beams EL toward a panel area 201 of the optical-touch panel 200. However, the projective light source 220 of this disclosure is not limited to be disposed on the upper left corner, and it can be disposed at different positions on the frame 210.

As shown in FIG. 1, the optical-touch calibration method 100 performs the operation S100 for generating the projective beams EL by the projective light source 220, and the projective beams EL is reflected to the line optical sensor 240.

In this embodiment, the reflection unit 230 is disposed on the frame and configured for reflecting the projective beams EL to the line optical sensor 240. A detection portion of the line optical sensor 240 for optical sensing is formed in a shape of an elongated strip (or an elongated rectangle). In some embodiments, the line optical sensor 240 is disposed on an edge along one side of the frame 210. In the embodiment shown in FIG. 2A, the line optical sensor 240 is disposed on the left edge 211 of the frame 210 and configured for receiving and measuring the reflected projective beams EL.

In addition, as shown in FIG. 2B, the optical-touch panel 200 further includes a control unit 250 and a touch-sensing unit 260. The control unit 250 is coupled to the projective light source 220, the line optical sensor 240 and the touch-sensing unit 260. The touch-sensing unit 260 is coupled to the control unit 250 and the line optical sensor 240.

After the operation S100, the optical-touch calibration method 100 performs the operation S102 for utilizing the line optical sensor 240 to measure the reflected projective beams EL, so as to obtain a reflected intensity curve relative to a linear coordinate axis. In this embodiment, the linear coordinate axis corresponds to a vertical coordinate axis along the left edge 211. In other words, the line optical sensor 240 can obtain the reflected intensity curve relative to the vertical coordinate axis along the left edge 211.

In order to reflect the projective beams EL to the line optical sensor 240, the reflection unit 230 is at least disposed on the right edge 212 opposite to the line optical sensor 240. In order to achieve comprehensive reflection effect in practical applications, the reflection unit 230 is further disposed on the right edge 212 and the bottom edge 213, which are opposite to the line optical sensor 240 and the projective light source 220.

Figure 3A:
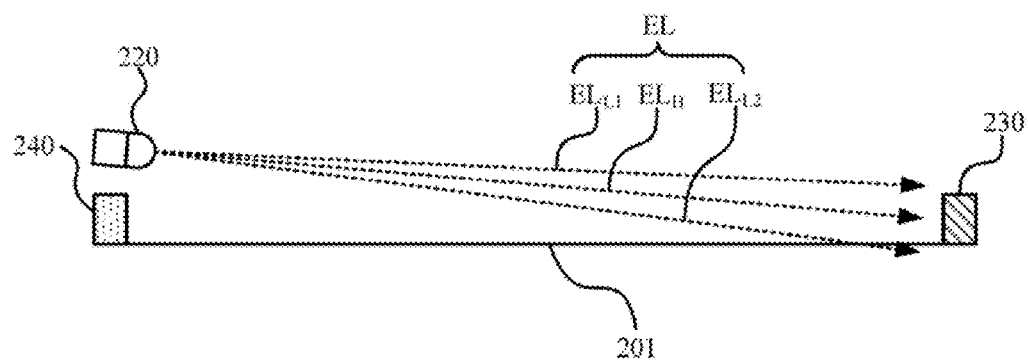
FIG. 3A is a side-view diagram illustrating the panel area of the optical-touch panel in a situation without a plate-bending deformation.
Figure 3B:
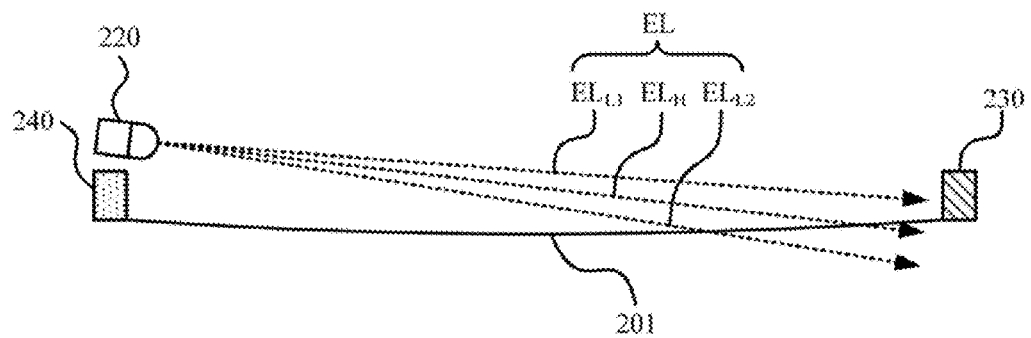
FIG. 3B is a side-view diagram illustrating the panel area of the optical-touch panel in a situation with a plate-bending deformation on the panel area.

Reference is also made to FIG. 3A, FIG. 3B, FIG. 4A, FIG. 4B, FIG. 4C and FIG. 4D. FIG. 3A is a side-view diagram illustrating the panel area 201 of the optical-touch panel 200 in a situation without a plate-bending deformation. FIG. 3B is a side-view diagram illustrating the panel area 201 of the optical-touch panel 200 in a situation with a plate-bending deformation on the panel area 201. FIG. 4A, FIG. 4B, FIG. 4C and FIG. 4D are schematic diagrams illustrating reflected intensity curves measured by the line optical sensor 240 under different situations (with/without the plate-bending deformation and with/without a touch event).

As shown in FIG. 3A and FIG. 3B, the projective beams EL generated by the projective light source 220 has a certain protective range (top from the projective beam $EL_{L1}$ down to the projective beam $EL_{L2}$) and a specific protective central axis. The projective beam $EL_H$ along the protective central axis usually has the highest projective intensity. On the other hand, the projective beam $EL_{L1}$ and the projective beam $EL_{L2}$ on two sides away from the protective central axis usually have relatively lower projective intensities.

Figure 4A:
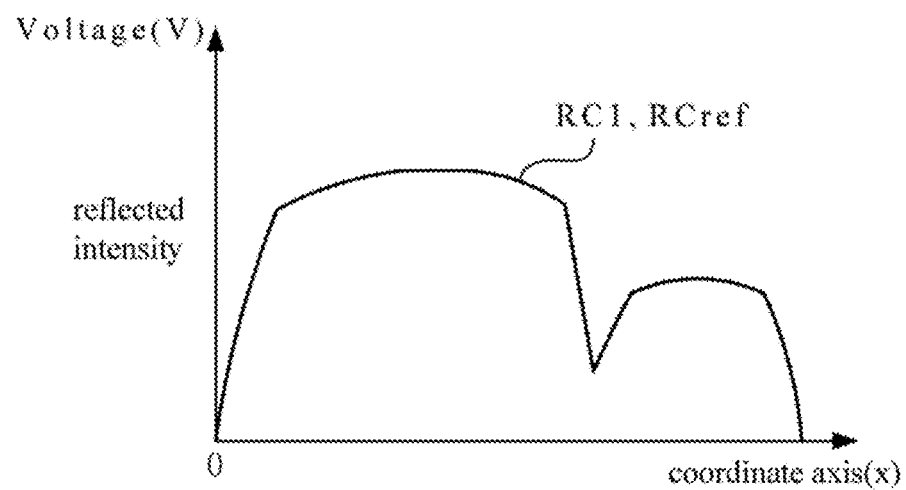
FIG. 4A, FIG. 4B, FIG. 4C and FIG. 4D are schematic diagrams illustrating reflected intensity curves measured by the line optical sensor under different situations.

As shown in FIG. 3A, when there is no plate-bending deformation on the panel area 201 of the optical-touch panel 200, the projective light source 220 is usually configured to project the projective beam $EL_H$ along the protective central axis in alignment with the reflection unit 230. Therefore, the line optical sensor 240 can measure the reflected intensity curve with a better signal quality (e.g., higher intensity or more complete waveform). A reflected intensity curve RCref shown in FIG. 4A is equal to a reflected intensity curve RC1, which is measured by the line optical sensor 240 when there is no plate-bending deformation on the panel area 201 of the optical-touch panel 200 and no touch event. In some embodiments, the control unit 250 is configured to store the reflected intensity curve RC1 as the reference intensity curve RCref.

In the other hand, when a plate-bending deformation within a certain degree occurs on the panel area 201 of the optical-touch panel 200 as shown in FIG. 3B, the protective central axis of the projective beams EL generated by the projective light source 220 is deviated from its original orientation. Therefore, the projective beam $EL_H$ along the protective central axis is no longer in alignment with the reflection unit 230. Instead, the projective beam $EL_{L1}$ with a lower projective intensity is in alignment with the reflection unit 230 and reflected to the line optical sensor 240. Accordingly, the reflected intensity curve measured by the line optical sensor 240 will be affected.

Figure 4B:
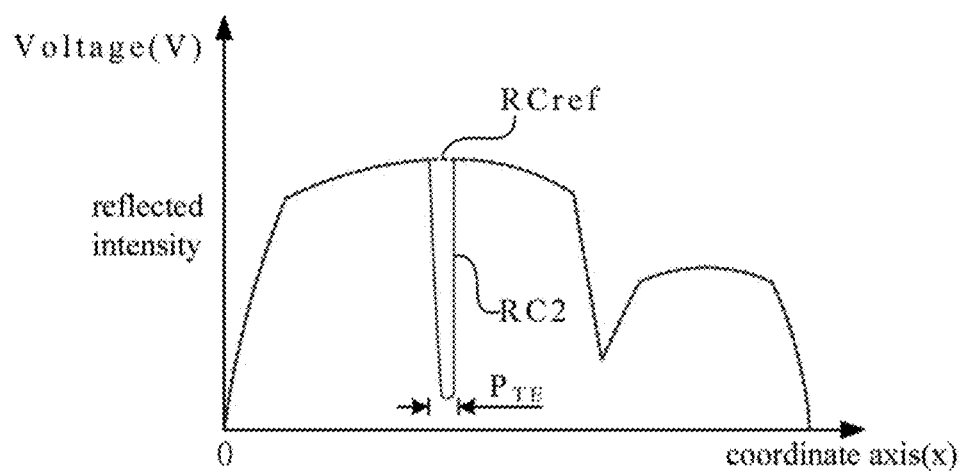
Figure 4C:
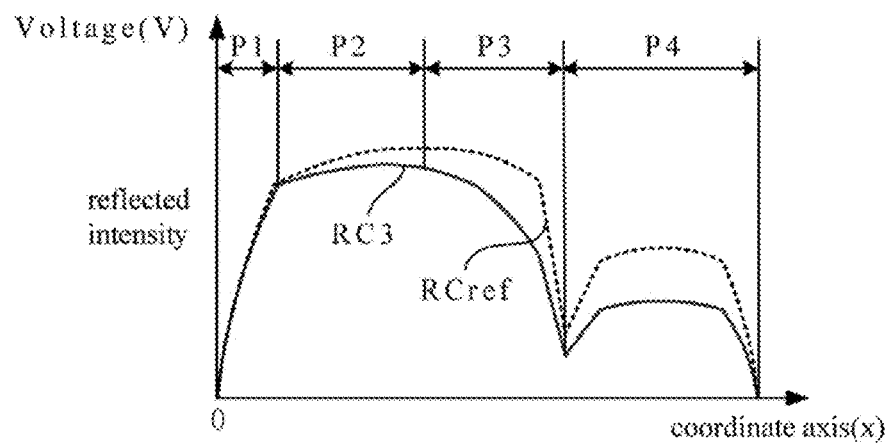

A reflected intensity curve RC3 shown in FIG. 4C is measured by the line optical sensor 240 when there is a plate-bending deformation on the panel area 201 of the optical-touch panel 200 and no touch event. In some embodiments, the control unit 250 is configured to compare the reflected intensity curve RC3 with the reference intensity curve RCref, so as to determine the severity/situation of the current plate-bending deformation. Details of aforesaid behaviors are disclosed in following paragraphs.

As shown in FIG. 1, the optical-touch calibration method 100 performs the operation S104 for calculating an intensity difference DIF between a reflected intensity curve (e.g., a reflected intensity curve RC1~RC4 shown in FIG. 4A~4D) and the reference intensity curve RCref. The intensity difference DIF between the reflected intensity curve and the reference intensity curve RCref corresponds to a deformational degree on the optical-touch panel 200.

In an example shown in FIG. 4A, when there is no plate-bending deformation on the panel area 201 of the optical-touch panel 200 and no touch event, there is substantially no difference between the reflected intensity curve RC1 and the reference intensity curve RCref. In other words, the intensity difference DIF in the case of the reflected intensity curve RC1 approximately equals to zero.

In an example shown in FIG. 4B, when there is no plate-bending deformation on the panel area 201 of the optical-touch panel 200 and there is a touch event, a difference between the reflected intensity curve RC2 and the reference intensity curve RCref only exists in a touch event region $P_{TE}$. Except for the touch event region $P_{TE}$, the reflected intensity curve RC2 is similar to the reference intensity curve RCref. When there is a touch-point existed, an object will block some reflected beams from the line optical sensor 240, such that a dramatic gradient variance occurs on the reflected intensity curve RC2 within a coordinate range (i.e., the touch event region $P_{TE}$) along the linear coordinate axis. In this case, the control unit 250 is configured for excluding the reflected intensity curve RC2 within the coordinate range (i.e., the touch event region $P_{TE}$) from calculating the intensity difference DIF, so as to prevent the real touch event from affecting the calculation result for anti-deformation. In this case, by excluding the touch event region $P_{TE}$, the intensity difference DIF in the case of the reflected intensity curve RC2 approximately equals to zero.

In an example shown in FIG. 4C, when there is a plate-bending deformation on the panel area 201 of the optical-touch panel 200 and there is no touch event, the reflected intensity curve RC3 will be different from the reference intensity curve RCref by varied degrees along the linear coordinate axis.

In one of embodiments in this disclosure, the intensity difference DIF between the reflected intensity curve RC3 and the reference intensity curve RCref is calculated by extracting an average difference in-between. Firstly, a gap between the reflected intensity curve RC3 and the reference intensity curve RCref is sampled evenly along the linear coordinate axis, so as to obtain multiple difference values evenly over the linear coordinate axis. Afterward, an average of the difference values is calculated as the intensity difference DIF. For example, the intensity difference DIF calculated from the average of the difference values is that the reflected intensity curve RC3 decreased by 16.25% relative to the reference intensity curve RCref.

However, the calculation of the intensity difference DIF is not limited by calculating from an average of the difference values. In another embodiment, the control unit 250 divides the linear coordinate axis into several sections (e.g., the four sections P1~P4 shown in FIG. 4C) at first. Afterward, at least one designated section is selected from the sections. For example, the sections P2 and P3 considered to induce a greater impact can be selected and the sections P1 and P4 located on outer sides can be excluded. Afterward, difference values between the reflected intensity curve RC3 and the reference intensity curve RCref within the designated sections (i.e., the sections P2 and P3) along the linear coordinate axis are calculated. The intensity difference DIF can be obtained from an average of the difference values. For example, the intensity difference DIF calculated in aforesaid manner is that the reflected intensity curve RC3 (within the designated sections P2 and P3) decreased by 27% relative to the reference intensity curve RCref.

In still another embodiment, the control unit 250 divides the linear coordinate axis into several sections (e.g., the four sections P1~P4 shown in FIG. 4C) at first. Afterward, difference values between the reflected intensity curve RC3 and the reference intensity curve RCref are calculated corresponding to each of the sections, so as to obtain a sectional difference within each of the sections. Afterward, the intensity difference DIF is obtained from a weighted average of the sectional differences of the sections.

Figure 4D:
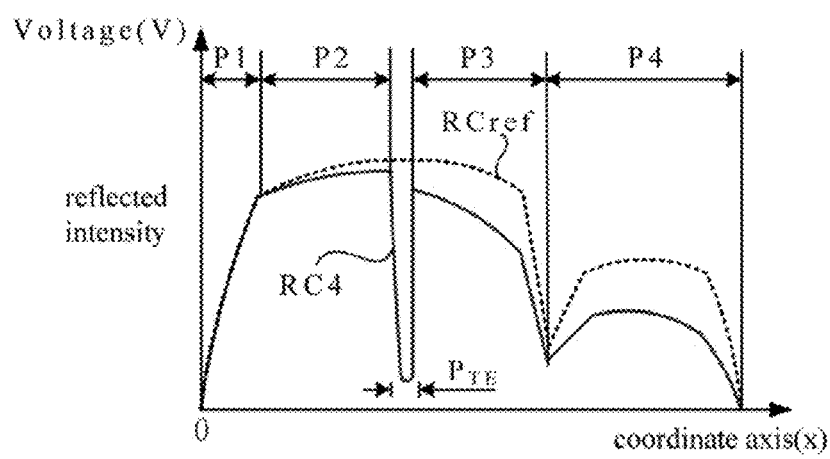

In an example shown in FIG. 4D, when there is a plate-bending deformation on the panel area 201 of the optical-touch panel 200 and there is also a touch event, the reflected intensity curve RC4 will be different from the reference intensity curve RCref by varied degrees along the linear coordinate axis (referring to aforesaid manners disclosed in embodiments related to FIG. 4C). Similarly, when there is a touch-point existed, a dramatic gradient variance occurs on the reflected intensity curve RC4 within a coordinate range (i.e., the touch event region $P_{TE}$) along the linear coordinate axis. In this case, the control unit 250 is configured for excluding the reflected intensity curve RC4 within the coordinate range (i.e., the touch event region $P_{TE}$) from calculating the intensity difference DIF, so as to prevent the real touch event from affecting the calculation result for anti-deformation.

As shown in FIG. 1, the optical-touch calibration method 100 performs the operation S106 for evaluating a level of the intensity difference DIF.

If the intensity difference DIF is below the first threshold value RF1 (e.g., 5% relative to the reference intensity curve or another acceptable difference value), it represents that there is no plate-bending deformation on the panel area 201 (e.g., referring to FIG. 3A) or the deformation is not severe. In this case, the optical-touch calibration method 100 performs the operation S108 for transmitting the reflected intensity curve (e.g., referring to the reflected intensity curve RC2 shown in FIG. 4B) sensed by the line optical sensor 240 to the touch-sensing unit 260, and accordingly the touch-sensing unit 260 executes a touch-point determining function based on the reflected intensity curve, so as to achieve an optical touch-sensing function.

If the intensity difference DIF exceeds the first threshold value RF1 (e.g., 5% relative to the reference intensity curve or another acceptable difference value) and is below a second threshold value RF2 (e.g., 70% relative to the reference intensity curve or another difference value which is too large to be calibrated), it represents that there is a plate-bending deformation on the panel area 201 (e.g., referring to FIG. 3B) or the deformation is not severe. In this case, the optical-touch calibration method 100 performs the operation S110 for adjusting an emitting power of the projective light source 220 by the control unit 250, so as to calibrate the plate-bending deformation.

Figure 4E:
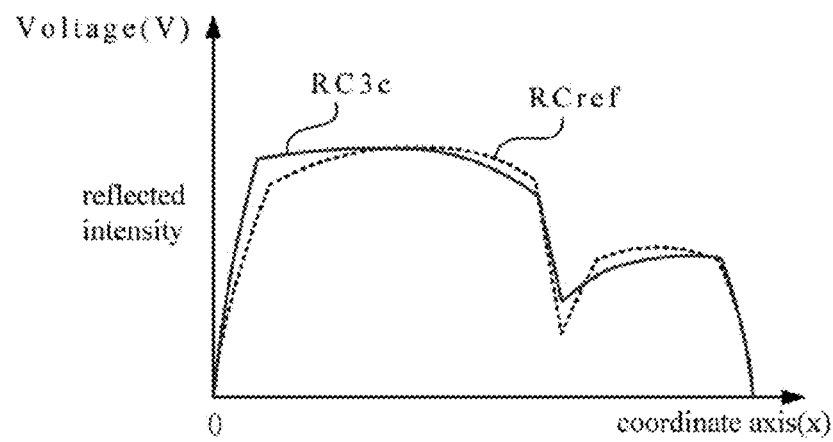
FIG. 4E is a schematic diagram illustrating a calibrated reflection intensity curve from the reflection intensity curve shown in FIG. 4C.

For example, if there is a plate-bending deformation and the reflected intensity curve measured by the line optical sensor 240 is illustrated as the reflected intensity curve RC3 shown in FIG. 4C, the intensity difference DIF is that the reflected intensity curve RC3 decreased by 16.25% relative to the reference intensity curve RCref in this situation. In this case, the optical-touch calibration method 100 performs the operation S110 for adjusting the emitting power of the projective light source 220 in a corresponding proportion, so as to make the reflection intensity curve after calibration approach to the reference intensity curve RCref. As shown in FIG. 4E, which is a schematic diagram illustrating a calibrated reflection intensity curve RC3c from the reflection intensity curve RC3 shown in FIG. 4C. As shown in FIG. 4E, the control unit 250 adjusts the emitting power of the projective light source 220 in proportional to the intensity difference DIF in the previous measurement, such that an intensity of the reflection intensity curve RC3c after calibration is boosted by a certain degree to approach the reference intensity curve RCref. An intensity difference DIF of the calibrated reflection intensity curve RC3c related to the reference intensity curve RCref will be reduced dramatically and shall be below the first threshold value RF1, such that the regular optical touch-sensing function can be resumed.

If the intensity difference DIF exceeds the second threshold value RF2 (e.g., 70% relative to the reference intensity curve or another difference value which is too large to be calibrated), it represents that there is a plate-bending deformation on the panel area 201 (e.g., referring to FIG. 3B) and the plate-bending deformation is so severe that the reflection unit 230 has been shifted out of the protective range of the projective beams EL. In this case, the projective beams EL are no longer reflected by the reflection unit 230 to the line optical sensor 240. Therefore, the calibration can not be done by adjusting the emitting power of the projective light source 220. At the time, the optical-touch calibration method 100 performs the operation S112 for suspending the touch-point determining function and remaining a previous touch state. In addition, the control unit 250 can generate an error report to inform users.

Based on aforesaid embodiments, the disclosure provides an optical-touch calibration method and an optical-touch panel. The optical-touch panel includes a line optical sensor, which is utilized to obtain a reflected intensity curve relative to a linear coordinate axis. When a deformation occurs to the optical-touch panel, an intensity difference between the reflected intensity curve and a reference intensity curve is calculated, and an emitting power of the projective light source is adjusted according to the calculation result, so as to calibrate the deformation bias on the optical-touch panel.

In addition, the disclosure utilizes a line optical sensor to provide an anti-deformation method. The line optical sensor has advantages in lower cost, smaller size and faster computing. If an external force varies the emitting angle of the light source or the receiving angle of the line optical sensor, the optical-touch calibration method and the optical-touch panel can detect the deformation on the touch panel and react corresponding to the deformation, so as to avoid a touch error or a discontinuous touch-event. In this case, the touch-sensing function of the optical-touch panel can operate properly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical-touch calibration method, suitable for an optical-touch panel including a projective light source, a line optical sensor and a deformable touch panel plate on which a touch operation is performed, the optical-touch calibration method comprising:
    generating a projective beam by the projective light source, and the projective beam being reflected to the line optical sensor;
    utilizing the line optical sensor to measure the reflected projective beam for obtaining a reflected intensity curve relative to a linear coordinate axis;
    calculating an intensity difference between the reflected intensity curve and a reference intensity curve, wherein the intensity difference between the reflected intensity curve and the reference intensity curve corresponds to a deformational degree of the deformable touch panel plate on the optical-touch panel: when the deformable touch panel plate deforms within a certain degree on the optical-touch panel, a protective central axis of the projective beam generated by the projective light source is deviated from its original orientation, causing the intensity difference; and
    adjusting an emitting power of the projective light source if the intensity difference exceeds a first threshold value.

2. The optical-touch calibration method of claim 1, further comprising:
    if the intensity difference is below the first threshold value, performing a touch-point determining function according to the reflected intensity curve measured by the line optical sensor.

3. The optical-touch calibration method of claim 2, further comprising:
    if the intensity difference exceeds a second threshold value, suspending the touch-point determining function and remaining a previous touch state, wherein the second threshold value is larger than the first threshold value.

4. The optical-touch calibration method of claim 1, wherein the step of calculating the intensity difference comprises:
    sampling along the linear coordinate axis according to a gap between the reflected intensity curve and the reference intensity curve, so as to obtain a plurality of difference values along the linear coordinate axis; and
    obtaining the intensity difference from an average of the difference values.

5. The optical-touch calibration method of claim 1, wherein the step of calculating the intensity difference comprises:
    dividing the linear coordinate axis into a plurality of sections;
    selecting at least one designated section from the sections;
    calculating a plurality of difference values between the reflected intensity curve and the reference intensity curve within the at least one designated section along the linear coordinate axis; and
    obtaining the intensity difference from an average of the difference values.

6. The optical-touch calibration method of claim 1, wherein the step of calculating the intensity difference comprises:
    dividing the linear coordinate axis into a plurality of sections;
    calculating a plurality of difference values between the reflected intensity curve and the reference intensity curve corresponding to each of the sections, so as to obtain a sectional difference within each of the sections; and
    obtaining the intensity difference from a weighted average of the sectional differences of the sections.

7. The optical-touch calibration method of claim 1, wherein the step of calculating the intensity difference comprises:
    if a dramatic gradient variance occurs on the reflected intensity curve within a coordinate range along the linear coordinate axis, excluding the reflected intensity curve within the coordinate range from calculating the intensity difference.

8. The optical-touch calibration method of claim 1, wherein the line optical sensor is utilized to measure the reflected projective beam for obtaining an intensity curve relative to the linear coordinate axis when the optical-touch panel is undeformed, and the intensity curve serves as the reference intensity curve.

9. An optical-touch panel, comprising:
    a frame;
    a projective light source, disposed on the frame, for generating a projective beam;

a reflection unit, disposed on the frame, for reflecting the projective beam;

a line optical sensor, disposed on a first edge of the frame, for receiving and measuring the reflected projective beam, so as to obtain a reflected intensity curve relative to a linear coordinate axis;

a deformable touch panel plate on which a touch operation is performed; and a control unit, coupled with the projective light source and the line optical sensor, for calculating an intensity difference between the reflected intensity curve and a reference intensity curve, wherein the intensity difference between the reflected intensity curve and the reference intensity curve corresponds to a deformational degree of the deformable touch panel plate on the optical-touch panel: when the deformable touch panel plate deforms within a certain degree on the optical-touch panel, a protective central axis of the projective beam generated by the projective light source is deviated from its original orientation, causing the intensity difference; and the control unit being configured for adjusting an emitting power of the projective light source if the intensity difference exceeds a first threshold value.

10. The optical-touch panel of claim 9, wherein the reflection unit is disposed at least on a second edge of the frame and located opposite to the line optical sensor.

11. The optical-touch panel of claim 10, wherein the reflection unit is disposed on the second edge and a third edge of the frame and located opposite to the line optical sensor and the projective light source.

12. The optical-touch panel of claim 9, further comprising:

a touch-sensing unit coupled to the line optical sensor and the control unit, wherein, if the intensity difference is below the first threshold value, the touch sensing unit performs a touch-point determining function according to the reflected intensity curve measured by the line optical sensor.

13. The optical-touch panel of claim 12, wherein, if the intensity difference exceeds a second threshold value, the touch-sensing unit suspends the touch-point determining function and remains a previous touch state, and the second threshold value is larger than the first threshold value.

14. The optical-touch panel of claim 9, wherein the control unit samples along the linear coordinate axis according to a gap between the reflected intensity curve and the reference intensity curve, so as to obtain a plurality of difference values along the linear coordinate axis, and the control units obtains the intensity difference from an average of the difference values.

15. The optical-touch panel of claim 9, wherein the control unit divides the linear coordinate axis into a plurality of sections, selects at least one designated section from the sections, calculates a plurality of difference values between the reflected intensity curve and the reference intensity curve within the at least one designated section along the linear coordinate axis, and obtains the intensity difference from an average of the difference values.

16. The optical-touch panel of claim 9, wherein the control unit divides the linear coordinate axis into a plurality of sections, the control unit calculates a plurality of difference values between the reflected intensity curve and the reference intensity curve corresponding to each of the sections, so as to obtain a sectional difference within each of the sections, and the control unit obtains the intensity difference from an weighted average of the sectional differences of the sections.

17. The optical-touch panel of claim 9, wherein, if a dramatic gradient variance occurs on the reflected intensity curve within a coordinate range along the linear coordinate axis, the control unit excludes the reflected intensity curve within the coordinate range from calculating the intensity difference.

18. The optical-touch panel of claim 9, wherein the line optical sensor is utilized by the control unit to measure the reflected projective beam for obtaining an intensity curve relative to the linear coordinate axis when the optical-touch panel is undeformed, and the intensity curve serves as the reference intensity curve.

* * * * *